Jan. 2, 1923.
R. MALCOM.
EYE PROTECTOR.
FILED DEC. 23, 1918.
1,440,691.
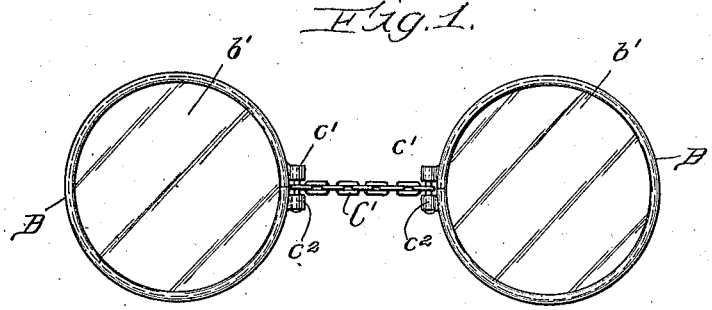
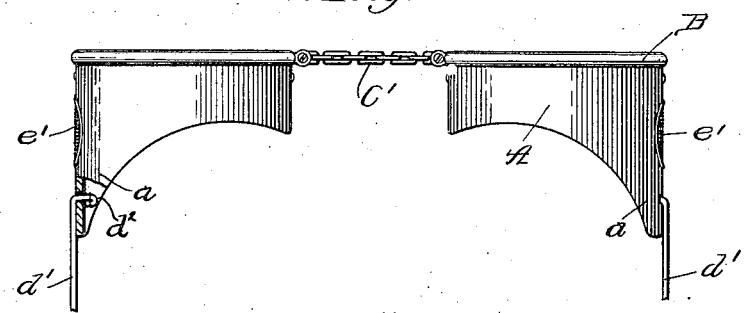
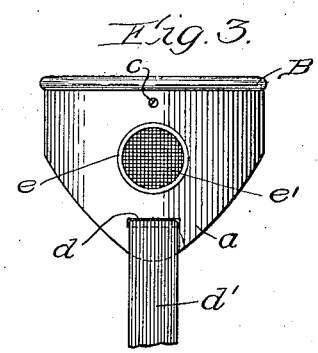
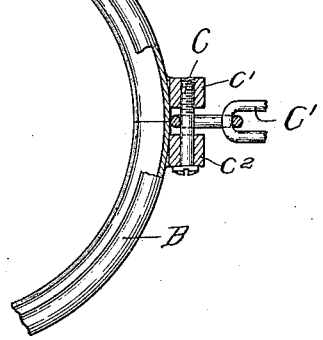
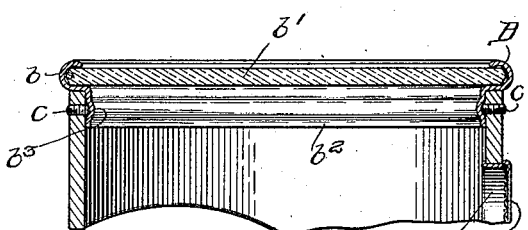
Inventor,
Robert Malcom.

Patented Jan. 2, 1923.

1,440,691

UNITED STATES PATENT OFFICE.

ROBERT MALCOM, OF CHICAGO, ILLINOIS.

EYE PROTECTOR.

Application filed December 23, 1918. Serial No. 267,910.

*To all whom it may concern:*

Be it known that I, ROBERT MALCOM, a citizen of the United States, residing at Chicago, Cook County, and State of Illinois, have invented certain new and useful Improvements in Eye Protectors, of which the following is a description.

My invention has for its object the production of an eye protector designed to be worn by workmen, vehicle drivers, and others, who are occupied in different industries where special protection to the eyes is necessary.

Another object of my invention is to provide a construction of this kind, whereby the lens holding frames are connected together by a bridge with end pieces capable of being bent to allow the frames to be folded together when not in use.

Another object of the invention is to provide simplified means for attaching the retaining bands of the eye protector in place, whereby said attaching means can be readily removed or renewed as desired.

In the accompanying drawings I have illustrated what I now consider the preferred form of my invention, although it is obvious that various changes as to the size, proportion, etc., may be varied without departing from the spirit of my invention, and in these drawings, Figure 1 is a plan view of my eye protector;

Figure 2 is a side elevation of the same;

Figure 3 is an end elevation;

Figure 4 is an enlarged detail of the same for attaching the nose piece or bridge, and Figure 5 is an enlarged sectional view of one of the lens holding frames and a fragmentary view of the retaining frame.

Referring to the drawings, A represents the lens retaining frames or eye cups, which may be preferably formed of fibre, or any other suitable material, and which are so shaped that they fit around the eyes of the wearer close to the temples by elongation of one side of the frame on a line diagonal to the axis thereof, as shown at $a$. The frame A is cylindrical in form and receives at the open end thereof a lens holding rim B. This rim is preferably metal bent to form an inwardly opening cylindrical groove $b$, within which a lense $b'$ is placed. Each lens holding rim B is provided with a flange $b^2$, having formed therein a bead $b^3$, which, when the rim is placed in position extends circumferentially thereof. Fastening devices, which may be screws $c$, are extended through the wall of the frame A, the end thereof engaging the flange $b^2$ to hold the metal rim B into the frame A.

The ends of the rim B are brought together, preferably, at the point of attachment with the nose piece, as shown in Figure 4, and each of the ends of the rim is provided with a lug $c'$, $c^2$. Coincident openings are provided in these lugs $c'$, $c^2$, through which a screw threaded bolt C passes and is engaged for the purpose of holding said rim B in circular form.

The bolts C form pintles for the flexible nose piece C', which in this instance is in the form of a chain connecting each pair of cups together.

In the elongated end of each of the frames or eye cups A, I provide a slot $d$, through which is secured an elastic cord $d'$, which is folded and hemmed or otherwise arranged to form a thickened portion at the end thereof $d^2$ which will not pass through the slot $d$. This cord is inserted through the slot $d$, from the inside of the cup and is held in place by the portion $d^2$. This fastening may be easily removed for the purpose of renewal or cleansing the same. In adjusting the eye-protectors upon the head of the wearer the free ends of each of the cords $d'$ are secured together in any well known manner to form a head band.

In the elongated side of each of the frames A, I provide means for ventilation, which consists of an opening through the frame A into which is fitted a ring $e$ held in place by frictional engagement with the fibre cup. $e'$ is a screen or the like which covers the opening and permits a circulation of air.

It will thus be seen that I have provided a simple, cheap and efficient eye protector, which fits closely around the eyes of the wearer, and is adapted to be folded into a small compact space when not in use; one from which the band $d'$ or retaining device may be easily removed and replaced; also one in which the lenses may be readily removed and new lenses replaced.

I claim:

1. An eye-protector, comprising a pair of eye-cups, each having one side thereof elongated on a line diagonal to the axis thereof, an expansible split ring forming a lens-holding rim removably secured in the cylinder of each eye-cup, a pair of lugs formed on the meeting ends of each expansible ring, means securing said lugs together, a flexible nosepiece having connection with the lug securing means, and means for holding said protector upon the head of the wearer.

2. An eye-protector comprising a pair of eye-cups, each having one side thereof elongated on a line diagonal to the axis thereof, a metal lens-holding frame provided with a retaining flange fitting inside of each eye-cup, means for securing said frame in place, lugs extending from the meeting ends of each lens-holding rim, a flexible nose piece hingedly attached to a pintle secured in each of said lugs, and means for securing said eye-protector upon the head of the wearer.

3. An eye-protector, comprising a pair of eye-cups, each having one side thereof elongated on a line diagonal to the axis, a split ring forming a lens-holding rim secured in the cylinder of each eye-cup, said ring having an inwardly opening groove, a lens in each of said grooves, a flange abutting the forward edge of the eye-cup; a flexible nose piece movably secured at each end thereof to the lens-holding rims, means for ventilation provided in the elongated side of each eye-cup, and a retaining band removably attached through openings in the elongated ends of each eye-cup, substantially as described.

4. An eye-protector, comprising a pair of eye-cups, each having one side thereof elongated on a line diagonal to the axis, expansible split rings, each having a lens-holding groove formed therein and means for closing each of said rings around the periphery of the lens, a circumferential shoulder in each of said rings seating on the forward edge of the eye-cup, one of said rings being removably secured in each eye-cup, the elongated side of each eye-cup having a transversely extending opening therein, a retaining band secured through each of said openings, substantially as described.

5. An eye-protector comprising a pair of eye-cups, each having one side thereof elongated on a line diagonal to the axis thereof, expansible split rings each having a groove formed therein to receive the lens, hinge members formed on the meeting ends of said rings, a pintle engaging the hinged members on each ring, a flexible nosepiece engaging said pintles, a shoulder formed in each ring which seats on the forward edge of the eye-cup; a flange fitting inside of the cylinder of the eye-cup, said flange having a bead formed therein to receive means for securing the ring inside of the cup.

6. An eye-protector comprising a pair of cylindrical eye-cups, each having one side thereof elongated on a line diagonal to the axis thereof, a split ring having a circumferential groove formed therein to receive the lens, a flange on said ring fitting inside of the cylinder of the cup, lugs formed on the meeting ends of said split ring, and a flexible nose piece movably attached to the lugs projecting from each of the lens holding rings.

In testimony whereof, I have signed this specification.

ROBERT MALCOM.